J. L. HEELEY.
ORNAMENTAL-CHAINS.

No. 177,834. Patented May 23, 1876.

Witnesses
Otto Hofeland.
Hugo Bruggemann

Inventor.
James L. Heeley
per
Van Santwoord & Hauff
Attorneys

UNITED STATES PATENT OFFICE.

JAMES L. HEELEY, OF NORTH ATTLEBOROUGH, MASSACHUSETTS.

IMPROVEMENT IN ORNAMENTAL CHAINS.

Specification forming part of Letters Patent No. 177,834, dated May 23, 1876; application filed March 15, 1876.

*To all whom it may concern:*

Be it known that I, JAMES L. HEELEY, of North Attleborough, in the county of Bristol and State of Massachusetts, have invented a new and useful Improvement in Ornamental Chain, which invention is fully set forth in the following specification, reference being had to the accompanying drawing, in which—

Figure 1:
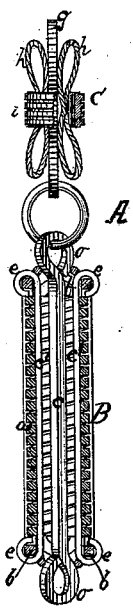
Figure 2:
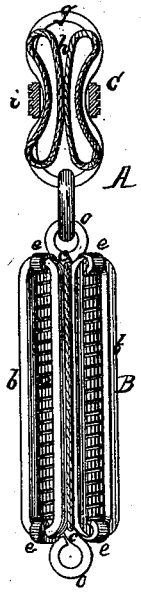

Figure 1 represents a longitudinal central section. Fig. 2 is a sectional side view.

My invention consists in coupling or connecting pieces for ornamental chains, composed of an oval ring depressed in the middle, two side pieces, and a collar which embraces the side pieces.

In the drawing, the letter A designates an ornamental chain, which is composed of links B and couplings or connecting-pieces C. Each of the links B is made of the following parts, viz., a tubular supporting-piece, $a$, made in the form of a spirally-wound wire, or in any other form suitable for the purpose; a central rod, $c$, which is provided with eyes $o$ at its ends, and two or more lateral rods, $c'$, which, together with the central rod, are inclosed in the supporting-piece $a$, and which are provided, at their ends, with hooks $e$, which engage with rings $b$, placed against the outside of the supporting-piece.

Two or more such rings may be used, and a corresponding number of lateral rods must be employed, each of said lateral rods serving to fasten one of the rings to the supporting-piece.

The links B are united with each other by means of connecting-pieces or couplings C, each of which consists of an oval ring, $g$, two side pieces, $h$, and a collar, $i$. The sides of the oval ring $g$ are pressed inward, as shown, so that the collar $i$, after having been closed around the side pieces and the ring, is firmly retained in position, and that no solder is required to fasten the several parts together.

I do not claim, in this application, the combination of the supporting-piece $a$, external rings $b$, and rods $c$ $c'$, having hooks which fasten the external rings to the supporting-piece $a$, inasmuch as I contemplate making such form the subject-matter of a separate application for Letters Patent.

What I claim as new, and desire to secure by Letters Patent, is—

In an ornamental chain, a coupling composed of an oval ring depressed in the middle, two side pieces, and a collar, which embraces the ring and the side pieces, substantially as set forth.

In testimony that I claim the foregoing I have hereunto set my hand and seal this 8th day of March, 1876.

JAMES L. HEELEY. [L. S.]

Witnesses:
W. HAUFF,
E. F. KASTENHUBER.